UNITED STATES PATENT OFFICE.

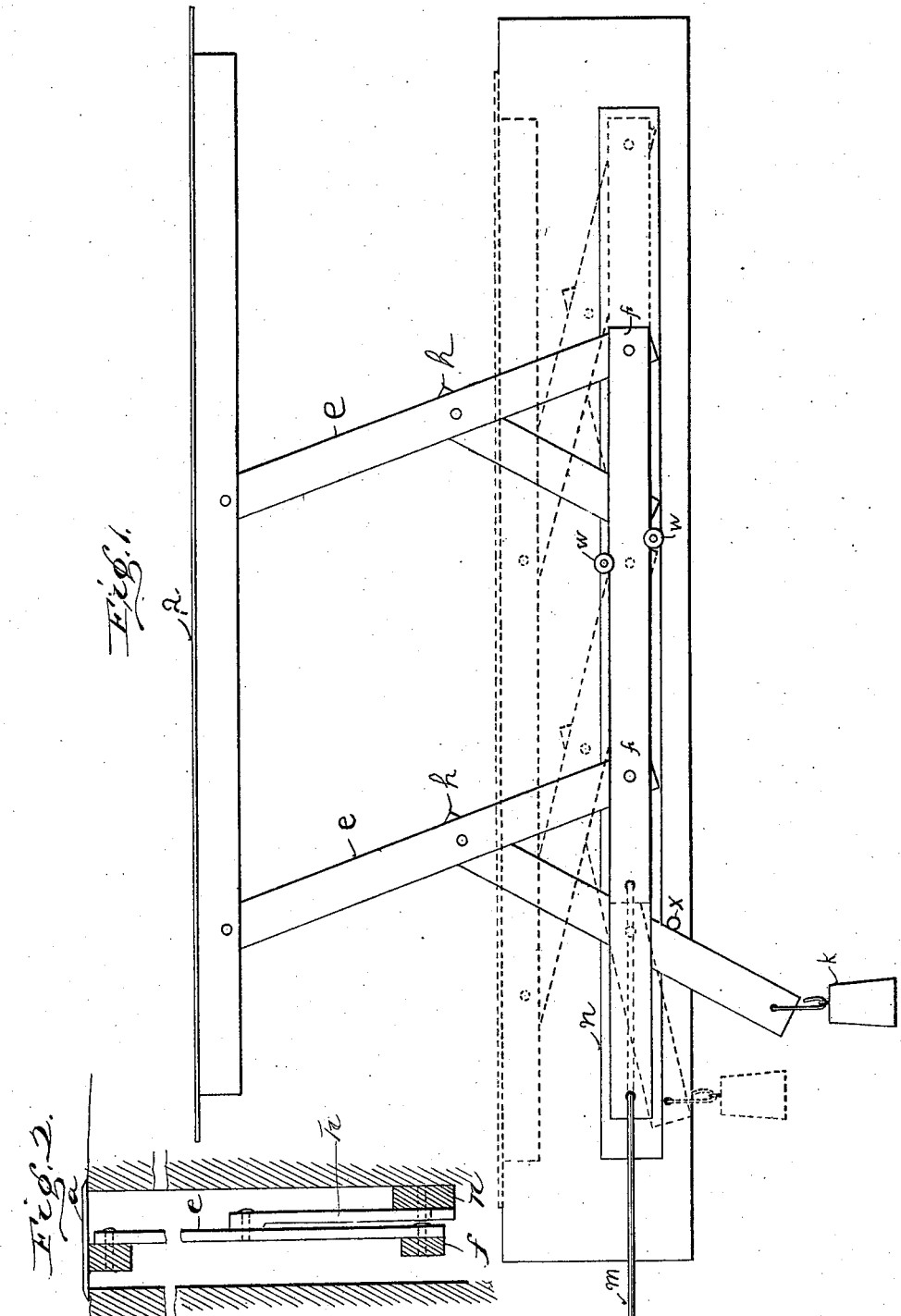

FRED H. NICHOLS, OF LYNN, MASSACHUSETTS.

ROADWAY-GATE.

SPECIFICATION forming part of Letters Patent No. 576,738, dated February 9, 1897.

Application filed September 20, 1895. Serial No. 563,076. (No model.)

*To all whom it may concern:*

Be it known that I, FRED HAMMOND NICHOLS, a citizen of the United States, residing at Lynn, in the county of Essex and Commonwealth of Massachusetts, have invented certain Improvements in Roadway-Gates, of which the following, taken in connection with the accompanying drawings, is a specification.

In the accompanying drawings, Figure 1 is a side elevation representing my improved gate in its most elevated position and showing by dotted lines the gate in folded position, and Fig. 2 is a cross-section.

In carrying out my invention a horizontal bar $a$ is employed. Having each one end pivotally connected therewith are supporting-bars $e$, their opposite ends being pivotally connected with the horizontal bar $f$. The bars $h$ have each one end in pivotal connection with the bars $e$ and have also a pivotal connection with the horizontal bar $n$. The bar $n$ is fixed and operates through the bars $h$ to support the framework composed of bars $a$ $e$ $f$. Said bar $f$ by this arrangement is allowed the endwise movement required to permit the bar $a$ to move upwardly and downwardly in a straight path when lifted and depressed by bars $e$.

This my improved gate is represented as designed for use in roadways at railroad and other crossings where it is desirable to have the gate mechanism depressed under ground or the road-level when not in use. To this end the bar $n$ is fixed in a suitable chamber below the road-bed. Said chamber also receives the bars $e$ $f$ $h$, as shown, the arrangement being such that the bar $a$ is movable to its elevated position above the road-bed for use, as shown in full lines, and therefrom again to the level of the road-bed when out of use, as is shown by dotted lines. This is effected by longitudinal movement of the bar $f$, and to facilitate this operation a cable $m$ is attached to the bar $f$, wherethrough power may be applied thereto as required. As shown in the present instance, one of the bars, $h$, is extended below the bar $n$, and to the end thereof is applied a weight $k$, whereby is balanced the framework of the gate in whole or in part, as desired. The bar $f$ is held in sliding contact with bar $n$ by antifriction-rolls $w$, while a stop $x$ is employed to engage bar $h$, and thus limit the upward movement of bar $a$ in an obvious manner.

Having thus described my invention, what I claim, and desire by Letters Patent to secure, is—

A roadway-gate apparatus comprising a chamber, a fixed bar $n$ therein, bars $h$ pivoted at their lower ends upon said fixed bar, bars $e$ pivoted upon the free ends of the bars $h$, a bar $a$ pivoted upon the upper ends of the bars $e$, a bar $f$ pivoted to the lower ends of the bars $e$, guides, as $w$, between which the bar $f$ slides, and means for moving said bar $f$ to operate the gate: substantially as described.

Signed at Lynn this 28th day of July, A. D. 1895.

FRED H. NICHOLS.

Witnesses:
C. B. TUTTLE,
M. M. TUTTLE.